United States Patent

Takeuchi et al.

[11] Patent Number: 5,081,557
[45] Date of Patent: Jan. 14, 1992

[54] MAGNETIC DISK CARTRIDGE HAVING A CUTAWAY PORTION ON THE FRONT EDGE TO PREVENT DAMAGE FROM INCORRECT LOADING

[75] Inventors: Motoki Takeuchi; Akio Shinozaki, both of Tokyo; Kengo Oishi, Kanagawa, all of Japan

[73] Assignee: Fuji Photo Film Co., Ltd., Kanagawa, Japan

[21] Appl. No.: 452,647

[22] Filed: Dec. 19, 1989

[30] Foreign Application Priority Data

Dec. 19, 1988 [JP] Japan ............... 63-164179[U]
Mar. 31, 1989 [JP] Japan ............... 1-37721[U]

[51] Int. Cl.⁵ .................................... G11B 23/03
[52] U.S. Cl. ............................ 360/133; 369/291
[58] Field of Search ............... 360/133, 99.06; 369/291, 261, 270, 271; 206/444, 312

[56] References Cited

U.S. PATENT DOCUMENTS 4,868,699  9/1989  Kingsbury et al. ........... 360/133 X
4,876,619  10/1989  Suzuki ........................... 360/133 X

FOREIGN PATENT DOCUMENTS 0124174  5/1989  Japan ........................... 360/133

Primary Examiner—Andrew L. Sniezek
Attorney, Agent, or Firm—Sughrue, Mion, Zinn, Macpeak & Seas

[57] ABSTRACT

A magnetic disk cartridge includes a magnetic disk and a casing which accommodates therein the magnetic disk. The casing has a magnetic head opening through which a magnetic head gains access to the magnetic disk and a sliding shutter which slides between a closed position, where it covers the magnetic head opening, and an open position, in which the magnetic head opening is uncovered. The sliding shutter is provided with a first cutaway portion which is formed on the front edge of the shutter and can be engaged with a shutter opening pin which is provided in a disk drive and moves the sliding shutter to the open position when the magnetic disk cartridge is loaded into the drive. A second cutaway portion is formed in the front edge portion of the casing in a position substantially symmetrical to the position of the first cutaway portion about the centerline of the casing which is perpendicular to the front edge of the casing.

2 Claims, 2 Drawing Sheets

MAGNETIC DISK CARTRIDGE HAVING A CUTAWAY PORTION ON THE FRONT EDGE TO PREVENT DAMAGE FROM INCORRECT LOADING

BACKGROUND OF THE INVENTION

1. Field of the Invention

This invention relates to a magnetic disk cartridge having a sliding shutter which covers a magnetic head opening formed in the casing of the magnetic disk cartridge and which, when open, gives the magnetic head access to the magnetic disk stored in the casing of the disk cartridge.

2. Description of the Prior Art

There has been known a magnetic disk cartridge which has a casing having a magnetic head opening through which a magnetic head gains access to a magnetic disk accommodated in the casing, and a shutter which slides along the front edge of the casing (the edge which is inserted into the disk drive) and thus covers and uncovers the magnetic head opening.

In one such magnetic disk cartridge, the shutter is forced into the closed position by a spring and is opened by a shutter opening pin which is provided in the disk drive and slides the shutter into the open position, overcoming the force of the spring when the cartridge is loaded into the drive.

An example of such a magnetic disk cartridge is shown in FIG. 2A. In FIG. 2A, reference numerals 2, 4, 6, 8 and 10 respectively denote the shutter opening pin, the magnetic disk, the casing, the magnetic head opening and the shutter. The shutter 10 can be slid along the front edge 6a of the casing 6 and is forced by a spring (not shown) or the like in the direction of arrow A into the closed position, in which it covers the magnetic head opening 10. Thus the shutter 10 is held in the closed position when the magnetic disk cartridge is free. A cutaway portion 12, which may be engaged with the shutter opening pin 2, is formed in the front edge portion 10a of the shutter 10. When the magnetic disk cartridge is loaded into a disk drive, the shutter opening pin 2 (which is provided in the disk drive as described above) is brought into engagement with the cutaway portion 12 as shown in FIG. 2A and is moved in the direction of arrow B, whereby the shutter 10 is moved to the open position and thus uncovers the magnetic head opening 8. When the movement of the shutter opening pin 2 in the direction of the arrow B is completed, the disk drive senses that the magnetic head opening 8 has been uncovered and proceeds to the next step.

However, as shown in FIGS. 3A and 3B, when the magnetic disk cartridge is inserted into the disk drive upside down, the shutter opening pin 2 will abut against the front edge of the casing 6, and since the front edge of the casing 6 is flat, the shutter opening pin 2 can slide along the front edge of the casing 6 in the direction of the arrow B without the shutter 10 trailing along. When the shutter opening pin 2 is moved in the direction of the arrow B, the disk drive may proceed to the next step irrespective of whether the shutter 10 has actually been opened. Furthermore, the magnetic disk cartridge is not in the correct position relative to the disk drive. Accordingly, the magnetic head in the drive may impact against the outer surface of the casing and can be damaged. Further, the magnetic disk cartridge also can be deformed or damaged since it is not being supported correctly.

SUMMARY OF THE INVENTION

In view of the foregoing observations and description, the primary object of the present invention is to provide a magnetic disk cartridge which has a sliding shutter arranged such that it can be opened by a shutter opening pin in the disk drive and which can prevent the disk drive from proceeding to the next step when the cartridge has been loaded into the disk drive upside down.

Another object of the present invention is to provide a magnetic disk cartridge of the type described above which can be loaded into and unloaded from a disk drive without imparting a heavy load to the drive and which enables the user easily to discover that he or she has loaded the magnetic disk cartridge into the drive upside down.

In accordance with the present invention, there is provided a magnetic disk cartridge comprising a magnetic disk, a casing which accommodates therein the magnetic disk and has a magnetic head opening through which a magnetic head gains access to the magnetic disk, and a sliding shutter which slides between a closed position where it covers the magnetic head opening and an open position in which the magnetic head opening is uncovered, the sliding shutter being provided with a cutaway portion which is formed on the front edge thereof and may be engaged with a shutter opening pin which is provided in a disk drive and moves the sliding shutter to the open position when the magnetic disk cartridge is loaded into the drive, characterized by having an additional cutaway portion which is formed in the front edge portion of the casing in a position substantially symmetrical to the position of said cutaway portion about the centerline of the casing which is perpendicular to said front edge of the casing.

When the magnetic disk cartridge of the present invention is loaded into the disk drive upside down, the shutter opening pin is engaged with the additional cutaway portion of the magnetic disk cartridge and is held thereby. Accordingly, the disk drive cannot proceed to the next step.

Preferably the side edge of the additional cutaway portion nearer to said centerline of the casing is flared toward the centerline.

With this arrangement, when the magnetic disk cartridge is loaded into the disk drive upside down, the shutter opening pin abuts against the flared side edge of the additional cutaway portion, and this abutment produces a force which pushes back the magnetic disk cartridge. Accordingly, the user will notice that he or she has loaded the magnetic disk cartridge upside down. Further, the inclined side edge facilitates unloading of the magnetic disk cartridge.

DESCRIPTION OF THE PREFERRED EMBODIMENT

Figure 1:
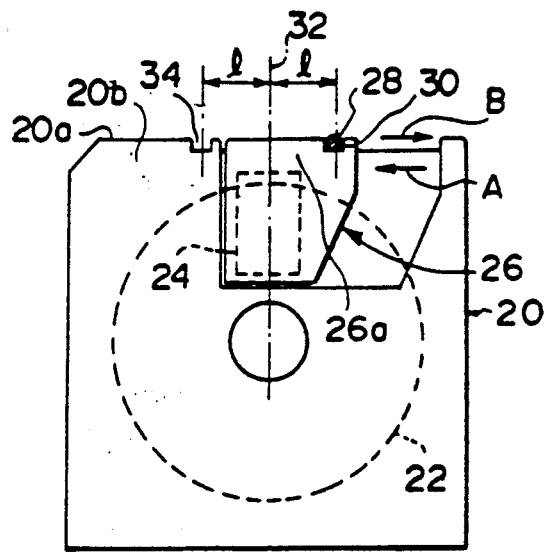
FIG. 1 is a plan view of a magnetic disk cartridge in accordance with an embodiment of the present invention.
Figure 2A:
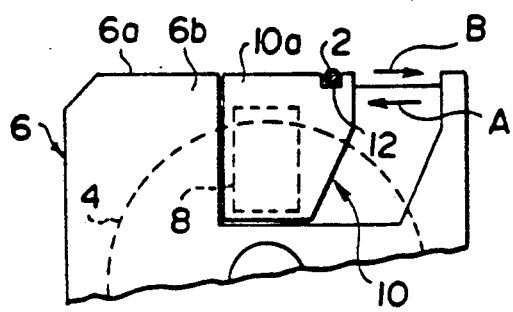
FIGS. 2A and 2B are fragmentary views showing different states of a conventional magnetic disk cartridge which has been correctly loaded into a disk drive.
Figure 2B:
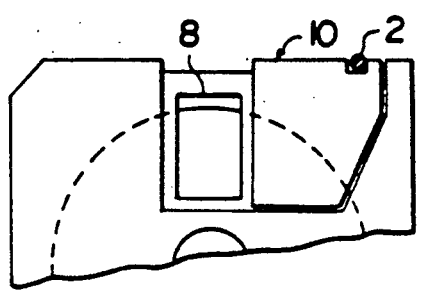
Figure 3A:
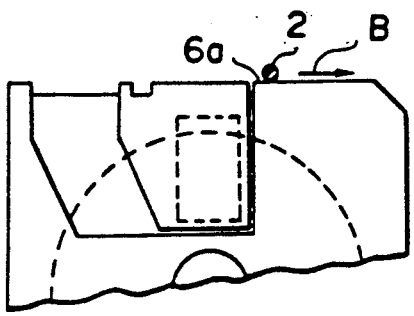
FIGS. 3A and 3B are fragmentary views showing different states of a conventional magnetic disk cartridge which has been loaded into a disk drive upside down.
Figure 3B:
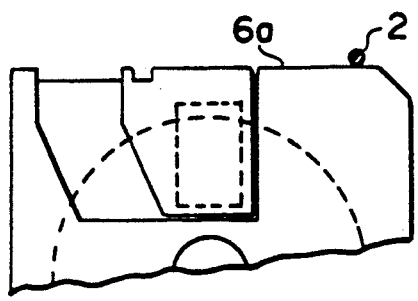

In FIG. 1, a magnetic disk 22 is accommodated in a casing 20. The casing 20 is provided with a magnetic head opening 24 through which a magnetic head of a disk drive (not shown) gains access to the magnetic disk 22, and a sliding shutter 26, which slides along the front edge 20a of the casing 20 (the edge which is inserted into the disk drive) and thus covers and uncovers the magnetic head opening 24. The sliding shutter 26 is forced by a spring (not shown) in the direction of arrow A into the closed position, where it covers the magnetic head opening 24. Thus the shutter 26 is held in the closed position when the magnetic disk cartridge is free.

A first cutaway portion 30, which can be engaged with a shutter opening pin 28, is formed in the front edge portion 26a of the shutter 26. Further, a second cutaway 34 similar to the first cutaway portion 30 is formed in the front edge portion 20b of the casing in a position substantially symmetrical to the position of the first cutaway portion 30 about the centerline 32 of the casing 20 which is perpendicular to the front edge 20a of the casing 20. That is, the distance l between the second cutaway portion 34 and the center line 32 is substantially equal to that between the first cutaway portion 30 and the center line 32.

When the magnetic disk cartridge of this embodiment has been loaded correctly into the disk drive, the shutter opening pin 28 will become engaged with the first cutaway portion 30 and will move in the direction of arrow B, which causes the sliding shutter 26 to uncover the magnetic head opening 24. Thereafter, the disk drive proceeds to the next step. When the magnetic disk cartridge of this embodiment has been loaded into the disk drive upside down, the shutter opening pin 28 will become engaged with the second cutaway portion 34 and will be prevented from moving in the direction of the arrow B. Accordingly, the disk drive cannot proceed to the next step.

Figure 4:
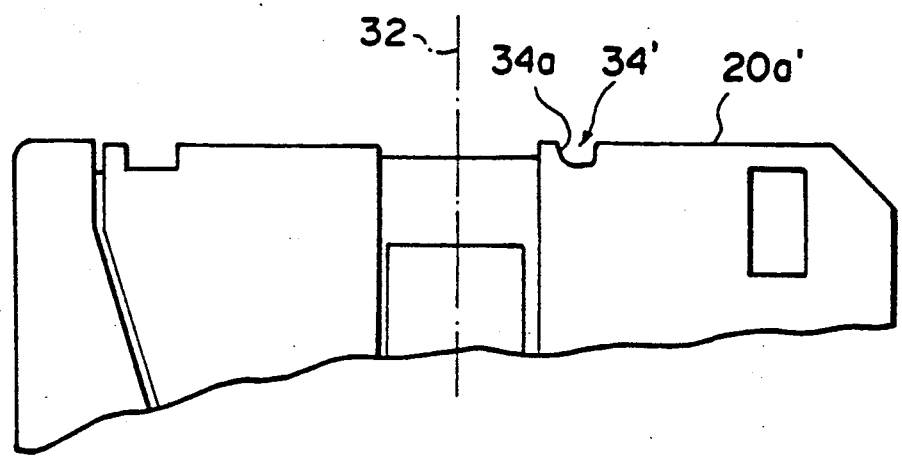
FIG. 4 is a fragmentary plan view of a magnetic disk cartridge in accordance with another embodiment of the present invention.
Figure 5:
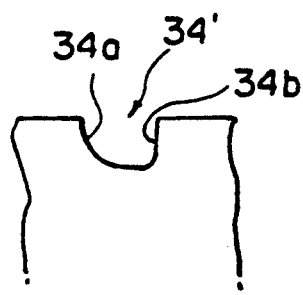
FIG. 5 is an enlarged view of a part of the magnetic disk cartridge shown in FIG. 4.

In the more preferred embodiment shown in FIGS. 4 and 5, the second cutaway portion 34' formed in the front edge portion 20a' of the casing has a side edge 34a which is flared toward the centerline 32 of the casing. The flared side edge 34a is nearer to the centerline 32 of the casing than the other side edge 34b which is substantially perpendicular to the front edge of the casing.

When the magnetic disk cartridge of this embodiment is loaded into the disk drive upside down, the shutter opening pin abuts against the flared side edge 34a of the second cutaway portion 34', and this abutment produces a force which pushes back the magnetic disk cartridge since the shutter opening pin is urged toward the center line 32. Accordingly, the user will notice that he or she has loaded the magnetic disk cartridge upside down. Further, by virtue of the flared side edge 34a, the magnetic disk cartridge can be smoothly removed from the disk drive without causing interference with the shutter opening pin.

The second cutaway portion 34' of this embodiment need not be limited to a trapezoid but may be a triangle so long as the side edge nearer to the centerline 32 is flared toward the centerline 32.

We claim:

1. A magnetic disk cartridge comprising a magnetic disk, a casing which accommodates therein the magnetic disk and has a magnetic head opening through which a magnetic head gains access to the magnetic disk, and a sliding shutter which slides between a closed position where it covers the magnetic head opening and an open position in which the magnetic head opening is uncovered, the sliding shutter being provided with a shutter cutaway portion which is formed on a front edge thereof and can be engaged with a shutter opening pin which is provided in a disk drive and moves the sliding shutter to the open position when the magnetic disk cartridge is loaded into the drive, wherein a casing cutaway portion is formed on a front edge portion of the casing in a position substantially symmetrical to a position of said shutter cutaway portion about a centerline of the casing which is perpendicular to said front edge of the casing when said sliding shutter is in said closed position, said casing cutaway portion engages with said shutter opening pin when the disk cartridge is loaded into the disk drive upside down, thereby preventing further operation of the disk drive.

2. A magnetic disk cartridge as defined in claim 1 in which a side edge of said casing cutaway portion nearer to the centerline of the casing perpendicular to the front edge of the casing is flared toward the said centerline.

* * * * *